US011192232B2

(12) United States Patent
Goble

(10) Patent No.: US 11,192,232 B2
(45) Date of Patent: *Dec. 7, 2021

(54) POWER TOOL WITH ANTI-KICKBACK CONTROL SYSTEM

(71) Applicant: BLACK & DECKER INC., New Britain, CT (US)

(72) Inventor: James E. Goble, Red Lion, PA (US)

(73) Assignee: Black & Decker Inc., New Britain, CT (US)

( * ) Notice: Subject to any disclaimer, the term of this patent is extended or adjusted under 35 U.S.C. 154(b) by 185 days.

This patent is subject to a terminal disclaimer.

(21) Appl. No.: 16/713,259

(22) Filed: Dec. 13, 2019

(65) Prior Publication Data

US 2020/0114502 A1    Apr. 16, 2020

Related U.S. Application Data

(63) Continuation of application No. 15/604,728, filed on May 25, 2017, now Pat. No. 10,589,413.

(Continued)

(51) Int. Cl.
*B25F 5/00* (2006.01)
*B25F 5/02* (2006.01)
(Continued)

(52) U.S. Cl.
CPC .............. *B25F 5/02* (2013.01); *B25B 21/002* (2013.01); *B25B 23/147* (2013.01); *B25F 5/00* (2013.01);
(Continued)

(58) Field of Classification Search
CPC .... B25F 5/00; B25F 5/02; B25F 5/021; B25F 5/001; B25B 21/00; B25B 21/008;
(Continued)

(56) References Cited

U.S. PATENT DOCUMENTS 1,990,035 A    2/1935   Kratz et al.
2,617,971 A    11/1952  Stack
(Continued)

FOREIGN PATENT DOCUMENTS

DE    2442260    3/1976
DE    2541298    3/1976
(Continued)

OTHER PUBLICATIONS

Husling, Rand—MEMS Inertia Rate and Acceleration Sensor—pp. 169-176—1988.

(Continued)

*Primary Examiner* — Scott A Smith
(74) *Attorney, Agent, or Firm* — Scott B. Markow

(57) ABSTRACT

A power tool includes a housing, a motor received in the housing, an output driven by the motor, and a control system. The control system includes a rotational motion sensor configured to generate a rotational motion signal that corresponds to a rotational motion of the housing about an axis, a current sensor configured to generate a motor current signal that corresponds to an amount of current drawn by the motor, and a control circuit that is configured to receive the rotational motion signal and the motor current signal and to control operation of the motor. The control circuit is configured: (a) to determine, based on the current signal, whether a detected kickback condition is likely to be false; (b) to determine, based upon the rotational motion signal, whether an uncontrolled kickback condition has occurred; and (c) to initiate one or more protective operations upon determining that an uncontrolled kickback condition has occurred and is not likely to be false.

20 Claims, 7 Drawing Sheets

Related U.S. Application Data

(60) Provisional application No. 62/352,118, filed on Jun. 20, 2016.

(51) Int. Cl.

| | | |
|---|---|---|
| *B25B 23/147* | (2006.01) | |
| *B25B 21/00* | (2006.01) | |
| *F16P 3/00* | (2006.01) | |
| *G01C 19/08* | (2006.01) | |
| *G01P 15/00* | (2006.01) | |

(52) U.S. Cl.
CPC .............. *F16P 3/008* (2013.01); *G01C 19/08* (2013.01); *G01P 15/00* (2013.01); *B25B 21/00* (2013.01); *B25D 2250/221* (2013.01); *B25F 5/001* (2013.01)

(58) Field of Classification Search
CPC . B25B 23/14; B25B 23/147; B25D 2250/221; B25D 2211/003; B25D 16/003
USPC ........... 173/1, 2, 5, 176, 178, 183, 213, 217; 408/1 R, 6, 9
See application file for complete search history.

(56) References Cited

U.S. PATENT DOCUMENTS

| | | |
|---|---|---|
| 2,776,653 A | 1/1957 | Eaton |
| 3,083,508 A | 4/1963 | Fegley et al. |
| 3,463,990 A | 8/1969 | Ross |
| 3,554,302 A | 1/1971 | Adkins et al. |
| 3,616,864 A | 11/1971 | Sorensen et al. |
| 3,773,117 A | 11/1973 | Dussel |
| 3,847,229 A | 11/1974 | Wanner et al. |
| 3,939,920 A | 2/1976 | Hardiman et al. |
| 3,963,364 A | 6/1976 | Lemelson |
| 4,060,115 A | 12/1977 | Bocanegra Marquina |
| 4,066,133 A | 1/1978 | Voss |
| 4,095,547 A | 6/1978 | Benington |
| 4,104,778 A | 8/1978 | Vliet |
| 4,143,467 A | 3/1979 | Erspamer et al. |
| 4,249,117 A | 2/1981 | Leukhardt et al. |
| 4,262,528 A | 4/1981 | Holting et al. |
| 4,267,914 A | 5/1981 | Saar |
| 4,305,471 A | 12/1981 | Eshghy |
| 4,418,765 A | 12/1983 | Mori et al. |
| 4,426,588 A | 1/1984 | Weilenmann |
| 4,448,261 A | 5/1984 | Kousek et al. |
| 4,487,270 A | 12/1984 | Huber |
| 4,510,802 A | 4/1985 | Peters |
| 4,573,556 A | 3/1986 | Andeasson |
| 4,576,270 A | 3/1986 | Baltz et al. |
| 4,601,206 A | 7/1986 | Watson |
| 4,628,233 A | 12/1986 | Bradus |
| 4,638,870 A | 1/1987 | Kousek |
| 4,648,282 A | 3/1987 | Alender et al. |
| 4,732,221 A | 3/1988 | Dudek |
| 4,744,248 A | 5/1988 | Stewart |
| 4,754,669 A | 7/1988 | Verdier et al. |
| 4,759,225 A | 7/1988 | Reynerstson et al. |
| 4,793,226 A | 12/1988 | Kress |
| 4,820,962 A | 4/1989 | Millauer |
| 4,841,772 A | 6/1989 | Steward |
| 4,843,027 A | 6/1989 | Geekie |
| 4,871,033 A | 10/1989 | Odoni et al. |
| 4,878,404 A | 11/1989 | Liao |
| 4,885,511 A | 12/1989 | Millauer et al. |
| 4,948,164 A | 8/1990 | Hano et al. |
| RE33,379 E | 10/1990 | Bradus |
| 4,961,035 A | 10/1990 | Inaba et al. |
| 4,996,877 A | 3/1991 | Stewart et al. |
| 5,014,793 A | 5/1991 | Germantown et al. |
| 5,036,925 A | 8/1991 | Wache |
| D326,043 S | 5/1992 | Hasegawa et al. |
| 5,141,861 A | 8/1992 | Dale |
| 5,149,998 A | 9/1992 | Wolcott |
| 5,155,421 A | 10/1992 | Hansson |
| 5,156,221 A | 10/1992 | Breitenmoser |
| 5,166,882 A | 11/1992 | Stambaugh |
| 5,174,045 A | 12/1992 | Thompson et al. |
| 5,200,661 A | 4/1993 | Shramo et al. |
| 5,201,373 A | 4/1993 | Bloechle |
| 5,212,862 A | 5/1993 | Eshghy |
| 5,232,328 A | 8/1993 | Owczarz et al. |
| D339,279 S | 9/1993 | Baum |
| 5,245,747 A | 9/1993 | Hansson |
| 5,247,466 A | 9/1993 | Shimada et al. |
| 5,284,217 A | 2/1994 | Eshghy |
| 5,311,069 A | 5/1994 | Austin |
| 5,345,382 A | 9/1994 | Kao |
| 5,357,179 A | 10/1994 | Abbagnaro et al. |
| 5,361,022 A | 11/1994 | Brown |
| 5,365,155 A | 11/1994 | Zimmerman |
| 5,383,363 A | 1/1995 | Kulmaczewski |
| 5,385,052 A | 1/1995 | Hofmann |
| 5,401,124 A | 3/1995 | Hettich |
| 5,476,014 A | 12/1995 | Lampe et al. |
| 5,484,026 A | 1/1996 | Susaki et al. |
| 5,493,909 A | 2/1996 | Araki |
| 5,525,306 A | 7/1996 | Stevens |
| 5,538,089 A | 7/1996 | Sanford |
| 5,563,482 A | 10/1996 | Shaw et al. |
| 5,584,619 A | 12/1996 | Guzzella |
| 5,589,644 A | 12/1996 | Becker et al. |
| 5,615,130 A | 3/1997 | Bolan et al. |
| D378,727 S | 4/1997 | Kikuchi |
| 5,619,085 A | 4/1997 | Shramo |
| 5,635,638 A | 6/1997 | Geen |
| 5,637,968 A | 6/1997 | Kaienec et al. |
| D387,964 S | 12/1997 | Urvoy |
| 5,701,961 A | 12/1997 | Warner et al. |
| 5,704,435 A | 1/1998 | Meyer et al. |
| 5,714,698 A | 2/1998 | Tokoika et al. |
| D392,532 S | 3/1998 | Shiao |
| D392,535 S | 3/1998 | Vasudeva et al. |
| 5,730,232 A | 3/1998 | Mixer |
| 5,754,019 A | 5/1998 | Walz |
| 5,793,168 A | 8/1998 | Vitunic |
| 5,795,988 A | 8/1998 | Lo et al. |
| 5,806,401 A | 9/1998 | Rajala et al. |
| 5,812,420 A | 9/1998 | Takahashi |
| 5,831,402 A | 11/1998 | Yang |
| 5,879,111 A | 3/1999 | Stoeck et al. |
| 5,895,850 A | 4/1999 | Buestegens |
| 5,914,882 A | 6/1999 | Yeghiazarians |
| 5,954,457 A | 9/1999 | Stoeck et al. |
| 5,971,091 A | 10/1999 | Kamen et al. |
| 5,981,557 A | 11/1999 | Nagasawa et al. |
| 5,984,020 A | 11/1999 | Meyer et al. |
| 5,996,707 A | 12/1999 | Thome et al. |
| 6,005,489 A | 12/1999 | Siegle et al. |
| 6,044,918 A | 4/2000 | Noser et al. |
| 6,049,460 A | 4/2000 | Lin |
| 6,055,142 A | 4/2000 | Von Keudell et al. |
| 6,058,815 A | 5/2000 | Habermehl |
| 6,062,939 A | 5/2000 | Parker et al. |
| 6,111,515 A | 8/2000 | Schaer et al. |
| 6,129,699 A | 10/2000 | Haight et al. |
| 6,138,629 A | 10/2000 | Masberg et al. |
| 6,147,626 A | 11/2000 | Sakakibara |
| 6,158,929 A | 12/2000 | Fisher |
| 6,161,629 A | 12/2000 | Hohmann et al. |
| 6,209,394 B1 | 4/2001 | Ferrari et al. |
| 6,236,177 B1 | 5/2001 | Zick et al. |
| 6,343,318 B1 | 1/2002 | Bedi et al. |
| 6,387,725 B1 | 5/2002 | Ferrari et al. |
| 6,408,252 B1 | 6/2002 | DeSmet |
| 6,415,875 B1 | 7/2002 | Meixner |
| 6,479,958 B1 | 11/2002 | Thompson et al. |
| 6,517,896 B1 | 2/2003 | Horng et al. |
| 6,526,852 B2 | 3/2003 | Rahmsdorf et al. |
| 6,567,068 B2 | 5/2003 | Rekimoto |
| 6,581,714 B1 | 6/2003 | Kamen et al. |
| 6,612,034 B2 | 9/2003 | Damstra |

(56) References Cited

U.S. PATENT DOCUMENTS

| | | |
|---|---|---|
| 6,640,733 B2 | 11/2003 | Huffmeyer |
| D485,737 S | 1/2004 | Schaub et al. |
| 6,700,341 B2 | 3/2004 | Schaer et al. |
| D493,888 S | 8/2004 | Reschke |
| D494,829 S | 8/2004 | Lin |
| 6,779,952 B2 | 8/2004 | Zhang |
| 6,796,921 B1 | 9/2004 | Buck et al. |
| 6,834,730 B2 | 12/2004 | Gass et al. |
| 6,836,614 B2 | 12/2004 | Gilmore |
| 6,842,991 B2 | 1/2005 | Levi et al. |
| 6,843,140 B2 | 1/2005 | Osselmann et al. |
| 6,843,141 B2 | 1/2005 | Spielmann et al. |
| 6,871,278 B1 | 3/2005 | Kouno et al. |
| 6,910,540 B2 | 6/2005 | Totsu |
| 6,923,266 B1 | 8/2005 | Totsu |
| 6,960,894 B2 | 11/2005 | Carusillo et al. |
| 6,965,835 B2 | 11/2005 | McGee et al. |
| 6,968,908 B2 | 11/2005 | Tokunaga et al. |
| D513,160 S | 12/2005 | DeBoer et al. |
| 6,983,506 B1 | 1/2006 | Brown |
| 7,011,165 B2 | 3/2006 | Kristen et al. |
| D517,634 S | 5/2006 | Nunez et al. |
| 7,036,703 B2 | 5/2006 | Grazioli et al. |
| 7,055,620 B2 | 6/2006 | Nadig et al. |
| 7,055,622 B2 | 6/2006 | Bone |
| 7,090,030 B2 | 8/2006 | Miller |
| 7,121,358 B2 | 10/2006 | Gass et al. |
| 7,121,598 B2 | 10/2006 | Pourtier et al. |
| 7,134,364 B2 | 11/2006 | Kageler et al. |
| 7,154,406 B1 | 12/2006 | Judge |
| D534,651 S | 1/2007 | Bruce et al. |
| 7,182,148 B1 | 2/2007 | Szieff |
| 7,197,961 B2 | 4/2007 | Kageler et al. |
| 7,225,884 B2 | 6/2007 | Aeberhard |
| 7,234,536 B2 | 6/2007 | Scholl et al. |
| 7,331,406 B2 | 2/2008 | Wottreng et al. |
| 7,347,158 B2 | 3/2008 | Hawkes |
| D565,380 S | 4/2008 | Rinner |
| 7,359,816 B2 | 4/2008 | Kumar et al. |
| 7,372,226 B2 | 5/2008 | Wiker et al. |
| 7,400,106 B2 | 7/2008 | DeCicco et al. |
| 7,410,006 B2 | 8/2008 | Zhang et al. |
| 7,456,603 B2 | 11/2008 | Kanekawa et al. |
| 7,463,952 B2 | 12/2008 | Bidou et al. |
| 7,469,753 B2 | 12/2008 | Klemm et al. |
| 7,487,844 B2 | 2/2009 | DeCicco et al. |
| 7,487,845 B2 | 2/2009 | Carrier et al. |
| 7,504,791 B2 | 3/2009 | Sieber et al. |
| 7,506,694 B2 | 3/2009 | Stirm et al. |
| 7,526,398 B1 | 4/2009 | Choi et al. |
| 7,546,785 B2 | 6/2009 | Roehm et al. |
| 7,551,411 B2 | 6/2009 | Woods et al. |
| 7,552,781 B2 | 6/2009 | Zhang et al. |
| 7,565,844 B2 | 7/2009 | Crass et al. |
| D606,827 S | 12/2009 | Fritz et al. |
| 7,642,741 B2 | 1/2010 | Sidman |
| 7,650,699 B2 | 1/2010 | Yamamoto |
| 7,681,659 B2 | 3/2010 | Zhang et al. |
| 7,682,035 B2 | 3/2010 | Wuensch et al. |
| 7,688,028 B2 | 3/2010 | Phillips et al. |
| 7,689,378 B2 | 3/2010 | Kolen |
| D613,144 S | 4/2010 | Lin |
| 7,708,085 B2 | 5/2010 | DeCicco et al. |
| 7,723,953 B2 | 5/2010 | Roehm et al. |
| D618,527 S | 6/2010 | Deguglimo et al. |
| 7,730,963 B2 | 6/2010 | Carrier et al. |
| 7,774,155 B2 | 8/2010 | Sata et al. |
| 7,832,286 B2 | 11/2010 | Nakagawa et al. |
| 7,861,796 B2 | 1/2011 | DeCicco et al. |
| 7,882,899 B2 | 2/2011 | Borinato et al. |
| 7,882,900 B2 | 2/2011 | Borinato et al. |
| 7,900,715 B2 | 3/2011 | Chen |
| 7,912,664 B2 | 3/2011 | Rozelle |
| 7,926,585 B2 | 4/2011 | Pozgay et al. |
| 7,936,148 B2 | 5/2011 | Roehm et al. |
| 7,942,084 B2 | 5/2011 | Wilson, Jr. et al. |
| 8,025,106 B2 | 9/2011 | Schmidt |
| 8,136,382 B2 | 3/2012 | Stewart |
| 8,179,069 B2 | 5/2012 | Matsunaga et al. |
| 8,286,723 B2 * | 10/2012 | Puzio ............... B25B 23/14 173/1 |
| 8,403,072 B2 * | 3/2013 | Eshleman ......... B25B 21/008 173/1 |
| 8,418,778 B2 * | 4/2013 | Eshleman ............ B25F 5/00 173/1 |
| 8,689,900 B2 * | 4/2014 | Miwa ................ B25F 5/001 173/176 |
| 8,919,456 B2 * | 12/2014 | Ng .................... G05B 15/02 173/11 |
| 9,071,188 B2 * | 6/2015 | Vanko ................. H02P 3/22 |
| 9,144,875 B2 * | 9/2015 | Schlesak ......... B23Q 11/0092 |
| 9,193,055 B2 * | 11/2015 | Lim ................... B25B 21/00 |
| 9,266,178 B2 * | 2/2016 | Eshleman ........... B25F 5/00 |
| 9,272,397 B2 * | 3/2016 | Goetz ............... B25B 21/00 |
| 9,352,456 B2 * | 5/2016 | Murthy ........... B25B 23/147 |
| 2001/0042630 A1 | 11/2001 | Kristen et al. |
| 2002/0033267 A1 | 3/2002 | Schweizer et al. |
| 2002/0053892 A1 | 5/2002 | Schaer et al. |
| 2002/0066632 A1 | 6/2002 | Kristen et al. |
| 2002/0170754 A1 | 11/2002 | Heinzmann |
| 2003/0000651 A1 | 1/2003 | Gensor |
| 2003/0037423 A1 | 2/2003 | Siegel |
| 2003/0116332 A1 | 6/2003 | Nadig et al. |
| 2003/0196824 A1 | 10/2003 | Gass et al. |
| 2004/0011632 A1 | 1/2004 | Hellmann et al. |
| 2004/0069511 A1 | 4/2004 | Spielmann et al. |
| 2004/0104034 A1 | 6/2004 | Osselmann et al. |
| 2004/0182175 A1 | 9/2004 | Day et al. |
| 2004/0211573 A1 | 10/2004 | Carrier et al. |
| 2004/0226424 A1 | 11/2004 | O'Bannion et al. |
| 2004/0226728 A1 | 11/2004 | Boeni et al. |
| 2005/0000998 A1 | 1/2005 | Grazioli et al. |
| 2005/0217874 A1 | 10/2005 | Forster et al. |
| 2006/0081386 A1 | 4/2006 | Zhang et al. |
| 2006/0103733 A1 | 5/2006 | Grady et al. |
| 2006/0124331 A1 | 6/2006 | Stirm et al. |
| 2006/0243469 A1 | 11/2006 | Webster |
| 2007/0068480 A1 | 3/2007 | Wiker et al. |
| 2007/0084613 A1 | 4/2007 | Zhang et al. |
| 2007/0095634 A1 | 5/2007 | Misuda |
| 2007/0114050 A1 | 5/2007 | Baumann et al. |
| 2007/0144270 A1 | 6/2007 | Crass et al. |
| 2007/0256914 A1 | 11/2007 | Lohr et al. |
| 2007/0281274 A1 | 12/2007 | Schraffran et al. |
| 2008/0011102 A1 | 1/2008 | Schell et al. |
| 2008/0110653 A1 | 5/2008 | Zhang et al. |
| 2008/0276760 A1 | 11/2008 | Kim |
| 2009/0051306 A1 | 2/2009 | Matsunaga et al. |
| 2009/0078057 A1 | 3/2009 | Schultz et al. |
| 2090/0065225 | 3/2009 | Forster et al. |
| 2009/0120657 A1 | 5/2009 | Carrier et al. |
| 2009/0139738 A1 | 6/2009 | Lippek |
| 2009/0211774 A1 | 8/2009 | Dvells, Jr. |
| 2009/0295313 A1 | 12/2009 | Suzuki et al. |
| 2010/0188245 A1 | 7/2010 | Nielsen et al. |
| 2010/0189887 A1 | 7/2010 | Nielsen et al. |
| 2010/0245086 A1 | 9/2010 | Nielsen et al. |
| 2010/0256939 A1 | 10/2010 | Borenstein |
| 2010/0263591 A1 | 10/2010 | Nielsen et al. |
| 2010/0263891 A1 | 10/2010 | Carrier et al. |
| 2011/0007436 A1 | 1/2011 | Single et al. |
| 2011/0079406 A1 | 4/2011 | Elsmark et al. |
| 2011/0153081 A1 | 6/2011 | Romanov et al. |
| 2011/0160903 A1 | 6/2011 | Romanov et al. |
| 2011/0202175 A1 | 8/2011 | Romanov et al. |
| 2011/0301900 A1 | 12/2011 | Patel |
| 2012/0000682 A1 | 1/2012 | Grazioli |
| 2012/0090863 A1 | 4/2012 | Puzio et al. |
| 2013/0105189 A1 | 5/2013 | Murthy |
| 2014/0053419 A1 * | 2/2014 | Leh ................... B23D 51/16 30/392 |

(56) References Cited

U.S. PATENT DOCUMENTS

| | | | |
|---|---|---|---|
| 2014/0196920 | A1 | 7/2014 | Wirnitzer |
| 2016/0031072 | A1 | 2/2016 | Jongsoo et al. |

FOREIGN PATENT DOCUMENTS

| | | |
|---|---|---|
| DE | 3128410 | 2/1983 |
| DE | 3239847 | 5/1983 |
| DE | 3400124 | 7/1985 |
| DE | 3519803 | 12/1985 |
| DE | 3938787 | 5/1991 |
| DE | 4243317 | 6/1993 |
| DE | 4204420 | 8/1993 |
| DE | 4330823 | 3/1995 |
| DE | 4334863 | 4/1995 |
| DE | 4334933 | 4/1995 |
| DE | 4344817 | 6/1995 |
| DE | 19540718 | 5/1997 |
| DE | 19628945 | 5/1997 |
| DE | 19620124 | 7/1997 |
| DE | 19632363 | 1/1998 |
| DE | 19651124 | 5/1998 |
| DE | 19726006 | 9/1998 |
| DE | 19843452 | 3/2000 |
| DE | 19900882 | 7/2000 |
| DE | 10117121 | 10/2002 |
| DE | 10309414 | 9/2004 |
| DE | 10318798 | 11/2004 |
| DE | 10340710 | 3/2005 |
| DE | 10348756 | 5/2005 |
| DE | 202005017686 | 1/2006 |
| DE | 102006016441 | 10/2007 |
| DE | 102007048052 | 4/2009 |
| DE | 102007062727 | 7/2009 |
| DE | 102009007977 | 7/2009 |
| DE | 102009001298 | 9/2010 |
| EP | 0018603 | 11/1980 |
| EP | 0199883 | 11/1986 |
| EP | 0303651 | 2/1989 |
| EP | 0345655 | 12/1989 |
| EP | 0666148 | 8/1995 |
| EP | 0771619 | 5/1997 |
| EP | 0773854 | 5/1997 |
| EP | 0841126 | 5/1998 |
| EP | 0841127 | 5/1998 |
| EP | 1008422 | 6/2000 |
| EP | 1151828 | 11/2001 |
| EP | 1188521 | 3/2002 |
| EP | 1201373 | 5/2002 |
| EP | 1379362 | 1/2004 |
| EP | 1391271 | 2/2004 |
| EP | 1398119 | 3/2004 |
| EP | 144177 | 8/2004 |
| EP | 1452278 | 9/2004 |
| EP | 1470898 | 10/2004 |
| EP | 1524084 | 4/2005 |
| EP | 1670134 | 6/2006 |
| EP | 1711308 | 10/2006 |
| EP | 1878541 | 1/2008 |
| EP | 1900484 | 3/2008 |
| EP | 2695691 A1 | 2/2014 |
| GB | 1261479 | 1/1972 |
| GB | 2086277 | 9/1981 |
| GB | 2306356 | 5/1997 |
| GB | 2347100 | 8/2000 |
| GB | 2400811 | 10/2004 |
| GB | 2410205 | 7/2005 |
| GB | 2440205 | 7/2005 |
| GB | 2420843 | 6/2006 |
| GB | 2436959 | 10/2007 |
| JP | 60252213 | 12/1985 |
| JP | 7270444 | 10/1995 |
| JP | 8197445 | 8/1996 |
| JP | 9038815 | 2/1997 |
| JP | 10156739 | 6/1998 |
| JP | 2005144625 | 6/2005 |
| JP | 4226869 | 2/2009 |
| JP | 8128825 | 8/2014 |
| RU | 2103156 | 1/1998 |
| WO | 3806508 | 9/1988 |
| WO | 20040024398 | 3/2004 |
| WO | 20050095061 | 10/2005 |
| WO | 20060045072 | 4/2006 |
| WO | 20090032314 | 3/2009 |
| WO | 20090083306 | 7/2009 |
| WO | 20090136840 | 11/2009 |

OTHER PUBLICATIONS

Thonshoff, H.K.—"Developments and Trends in Monitoring and Control of Machining Processes"—Annals of the CIRP—vol. 37/2/1988—pp. 611-622.

Radu, David—Extended European Search Report re: related European Patent Appln. No. EP17176268—dated Nov. 23, 2017—8 pages—The Hague.

* cited by examiner

POWER TOOL WITH ANTI-KICKBACK CONTROL SYSTEM

RELATED APPLICATION

This application claims priority under 35 U.S.C. § 120 as a continuation of U.S. patent application Ser. No. 15/604,728, filed May 25, 2017, now U.S. Pat. No. 10,589,413, titled "Power Tool with Anti-Kickback Control System," which claims priority, under 35 U.S.C. § 119(e), to U.S. Provisional Application No. 62/352,118, filed Jun. 20, 2016, titled "Power Tool with Anti-Kickback Control System," each which is incorporated by reference.

TECHNICAL FIELD

This application relates to a power tool with an anti-kickback control system.

BACKGROUND

U.S. Pat. No. 7,410,006 to Zhang and U.S. Pat. No. 8,316,958 to Schell, which are incorporated by reference, each disclose a power tool having a control system with a rotational motion sensor for detecting the onset of a kickback condition of a power tool and initiating a protective operation when a kickback condition is detected. However, nuisance initiation of the protective operation(s) (also known as false trips or indications) may occur when the tool is being operated under certain parameters or conditions (e.g., under no load or in hammer only mode).

SUMMARY

In an aspect, a power tool has a motor, a transmission, an output, and a control system configured to detect onset of a valid kickback condition and, upon detecting such a condition, and to initiate one or more protective operations. The control system includes a current sensor that senses motor current and a rotational motion sensor that senses rotational movement of the tool housing. The control system uses the signal from the current sensor to determine whether the tool is being operated in a manner (e.g., under a no load condition or in a hammer only mode) in which false indications of a kickback condition are likely to occur. The control system uses the signal from rotation sensor to determine whether an uncontrolled kickback condition has occurred. Based on determinations that a sensed kickback condition is likely to be valid and that a kickback condition has been sensed, the control system initiates one or more protective operations to avoid undesirable rotation of the power tool. The protective operation(s) may include one or more of interrupting power to the motor, reducing power to the motor, pulsing the motor, braking the motor, and/or actuating a mechanical or electromechanical clutch.

In another aspect, a method for initiating a protective response in a power tool having a rotary shaft, a current sensor, and a rotary motion sensor is disclosed. The method includes the steps of arranging the rotational motion sensor in the power tool, monitoring current delivered to the motor using the current sensor disposed in the power tool, determining whether the a kickback condition is likely to be valid based on input from the current sensor, monitoring rotational motion of the rotational motion sensor about a longitudinal axis of the rotary shaft using the rotational motion sensor disposed in the power tool, determining rotational motion of the rotational motion sensor with respect to the longitudinal axis of the rotary shaft using a controller disposed in the power tool and based on input from the rotational motion sensor, and initiating a protective operation upon determining that a kickback condition is likely to be valid and upon determining the rotational motion from the rotational motion sensor.

In another aspect, a method for initiating a protective response in a power tool having a rotary shaft rotatably driven by a motor is disclosed. The method includes the steps of monitoring current delivered to the motor using a current sensor disposed in the power tool, determining whether a detected kickback condition is likely to be valid based on input to a controller from the current sensor, monitoring rotational motion of the tool about a longitudinal axis of the shaft using a rotation motion sensor disposed in the power tool, determining whether a kickback condition has occurred based on input to the controller disposed in the power tool from the rotation motion sensor, and reducing motor speed to a non-zero value upon determining that a detected kickback condition is likely to be valid and upon determining that a kickback condition has occurred.

In another aspect, a power tool having an output shaft includes a control system. A motor is disposed in the power tool and drivably connected to the output shaft to impart rotary motion thereto. A current sensor is disposed in the power tool and operable to detect current delivered to the motor. A rotational motion sensor is disposed in the power tool and operable to detect rotational motion of the tool about a longitudinal axis of the output shaft. A controller is configured to receive a first signal indicative of current delivered to the motor from the current senor and a second signal indicative of rotational motion of the tool from the rotational motion sensor. Based on the first and second signals, the controller is operable to determine whether a kickback condition has occurred and whether the kickback condition is likely to be valid, and is operable to set rotational speed of the motor to a non-zero value based detection of a kickback condition that is likely to be valid.

In another aspect, a power tool includes a housing, a motor received in the housing, an output driven by the motor, and a control system. The control system includes a rotational motion sensor configured to generate a rotational motion signal that corresponds to a rotational motion of the housing about an axis, a current sensor configured to generate a motor current signal that corresponds to an amount of current drawn by the motor, and a control circuit that is configured to receive the rotational motion signal and the motor current signal and to control operation of the motor. The control circuit is configured: (a) to determine, based on the current signal, whether a detected kickback condition is likely to be false; (b) to determine, based upon the rotational motion signal, whether an uncontrolled kickback condition has occurred; and (c) to initiate one or more protective operations upon determining that an uncontrolled kickback condition has occurred and is not likely to be false.

Implementations of this aspect may include one or more of the following features. The one or more protective operations includes one or more of interrupting power to the motor, reducing power to the motor to a non-zero value, pulsing the motor, braking the motor, and actuating a clutch. The rotational motion sensor may include one or more of a gyroscope and an accelerometer. The current sensor may include a low resistance, high wattage resistor. The control circuit may include one or more of a controller, a microcontroller, and a motor control circuit. The control circuit may be configured to determine that the uncontrolled kickback condition has occurred when the rotational motion signal indicates that at least one of an angular rotation, an angular velocity, and an angular acceleration of the housing exceeds a threshold value. The control circuit may be configured to determine that the detected uncontrolled kickback condition is likely to be false when the current signal indicates that at least one of the amount of current drawn by the motor and a rate of change of the amount of current drawn by the motor is less than a threshold value.

The power tool may further include a mode change mechanism configured to select among a hammer only mode, a rotary drive only mode, and a rotary hammering mode, and a mode change sensor configured to generate a mode change signal that corresponds to the selected mode. The control circuit may be configured to prevent initiation of the one or more protective operations when the mode change signal indicates that the hammer only mode has been selected. The control circuit may be configured to determine that the detected uncontrolled kickback condition is likely to be false when the current signal indicates that the amount of current drawn by the motor is less than a current threshold value, and the control circuit is configured to set the current threshold value at a first current threshold value when the mode change signal indicates that the hammer only mode has been selected and at a different second current threshold value when the mode change signal indicates that the hammer only mode has not been selected.

In another aspect, a method for initiating a protective response in a power tool having a housing, a motor received in the housing, an output driven by the motor, a current sensor, and a rotational motion sensor is disclosed. The method includes receiving a current signal from the current sensor that corresponds to an amount of current drawn by the motor; determining whether a detected kickback condition is likely to be false based upon the current signal; receiving a rotational motion signal from the rotational motion sensor that corresponds to a rotational motion of the housing about an axis; determining whether an uncontrolled kickback condition has occurred based upon the rotational motion signal; and initiating one or more protective operations upon determining that an uncontrolled kickback condition has occurred and is not likely to be false.

Implementations of this aspect may include one or more of the following features. Initiating the one or more protective operations may include one or more of interrupting power to the motor, reducing power to the motor to a non-zero value, pulsing the motor, braking the motor, and actuating a clutch. The rotational motion sensor may include one or more of a gyroscope and an accelerometer. The current sensor may include a low resistance, high wattage resistor. Determining that an uncontrolled kickback condition has occurred may include determining that at least one of an angular rotation, an angular velocity, and an angular acceleration of the housing exceeds a threshold value. Determining that a detected uncontrolled kickback condition is likely to be false may include determining that at least one of the amount of current drawn by the motor and a rate of change of the amount of current drawn by the motor is less than a threshold value. Receiving a current signal and determining whether a detected kickback condition is likely to be false may be performed before or after receiving a rotational motion signal, and determining whether an uncontrolled kickback condition has occurred.

The power tool may further include a mode change mechanism configured to select among a hammer only mode, a rotary drive only mode, and a rotary hammering mode, and a mode change sensor configured to generate a mode change signal that corresponds to the selected mode. The method may further include preventing the initiating of the one or more protective operations when the mode change signal indicates that the hammer only mode has been selected. Determining that the detected uncontrolled kickback condition is likely to be false may include determining when the current signal indicates that the amount of current drawn by the motor is less than a current threshold value. The method may further include setting the current threshold value at a first current threshold value when the mode change signal indicates that the hammer only mode has been selected and at a different second current threshold value when the mode change signal indicates that the hammer only mode has not been selected.

Advantages may include one or more of the following. The power tool may avoid false or nuisance trips that may occur when the tool is operating under a no load condition and/or when operating in a hammer only mode. These and other advantages and features will be apparent from the description, the drawings, and the claims.

DETAILED DESCRIPTION

Figure 1:
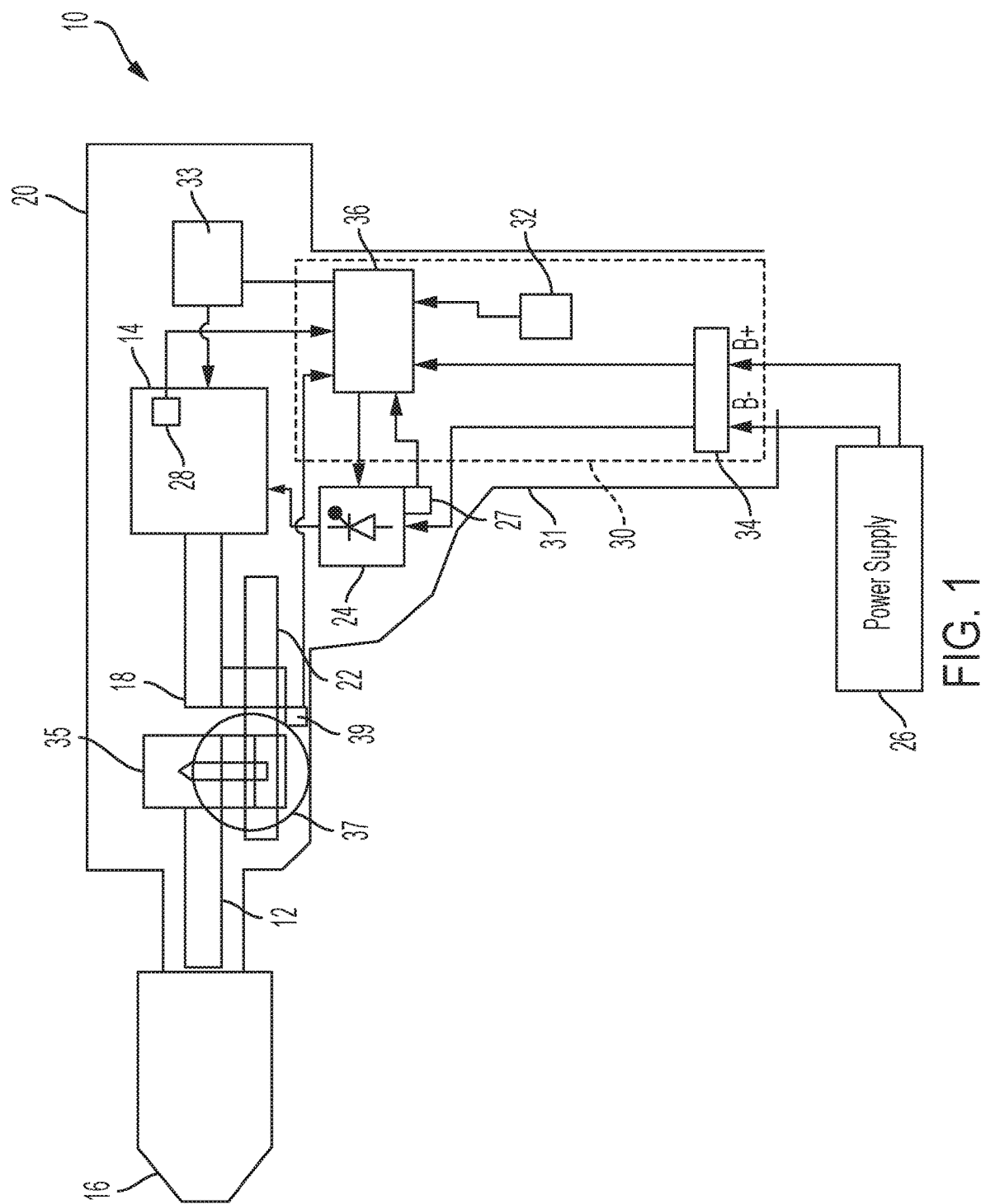
FIG. 1 is a schematic side view of an exemplary power tool.

Referring to FIG. 1, an exemplary power tool 10 is a hand held rotary hammer. While the following description is provided with reference to a rotary hammer, it is readily understood that the broader aspects of the present invention are applicable to other types of power tools having rotary shafts, such as drills, impact drivers, screwdrivers, saws, and hammers.

The rotary hammer includes a housing 20 and an output shaft or spindle 12 drivably coupled to an electric motor 14 (e.g., a brushless DC motor, a brushed DC motor, or an AC motor) received at least partially in the housing 20. A chuck 16 is coupled at one end of the spindle 12; whereas a drive shaft 18 of the electric motor 14 is connected via a transmission 22 to the other end of the spindle 12. A power supply 26 (e.g., a DC battery pack or an AC mains supply) is coupled to a power supply circuit 34 that is disposed in a handle 31 of the housing 20. Operation of the tool is controlled through the use an operator actuated trigger or switch 24 embedded in the handle of the tool. The switch 24 regulates current flow from the power supply 26 to the motor 14 via a controller, microprocessor or microcontroller 36 and a motor control circuit 33. In one implementation, the motor 14 is a brushless DC motor and the motor control circuit 33 includes a power switching circuit (e.g., a three-phase bridge driver circuit including six controllable semiconductor power devices (e.g. FETs, BJTs, IGBTs, etc.) and a power control circuit (e.g., a gate driver circuit and a power supply regulator circuit). The power tool may further include a temperature sensor.

The transmission 22 of the rotary hammer 10 may include a hammer drive arrangement and a mode change mechanism 35 configured to configure the rotary hammer 10 for operation in any one of a hammer only mode, a rotary drive only mode and a rotary hammering mode for changing the operation of the hammer drill. The mode change mechanism 35 may include an external knob or switch 37 that enables the user to select among these modes of operation. The rotary hammer 10 may also include a mode sensor 39 (e.g., a potentiometer) configured to detect a position of the switch 37 and determine which mode of operation has been selected by the user. An exemplary hammer drive arrangement, mode change mechanism and knob are described in U.S. Pat. No. 6,666,284, which is incorporated by reference, although other implementations are well known in the art. Although a few primary components of the rotary hammer are discussed above, it is readily understood that other components known in the art may be needed to construct an operational rotary hammer.

The power tool 10 includes a control system 30 to detect a kickback condition. The control system 30 may include a rotational motion sensor 32, a current sensor 28, and the microcontroller or microprocessor 36. In some instances, the onset of a kickback condition will cause the power tool housing 20 to rotate in the operator's grasp. The rotational motion sensor 32 detects any such rotational motion.

In an embodiment, the operating principle of the rotational motion sensor 32 is based on the Coriolis effect. Briefly, the rotational motion sensor is comprised of a resonating mass. When the power tool is subject to rotational motion about the axis of the spindle, the resonating mass will be laterally displaced in accordance with the Coriolis effect, such that the lateral displacement is directly proportional to the angular rate. It is noteworthy that the resonating motion of the mass and the lateral movement of the mass occur in a plane which is orientated perpendicular to the rotational axis of the rotary shaft. Capacitive sensing elements are then used to detect the lateral displacement and generate an applicable signal indicative of the lateral displacement. An exemplary rotational motion sensor is the ADXRS150 or ADXRS300 gyroscope device commercially available from Analog Devices. Other types of rotational motion sensors such as gyroscopes, accelerometers, and other MEMS devices may also be used.

The microcontroller 36 may determine the onset of a kickback condition based on the signal received from the rotational motion sensor 32. For instance, the microcontroller 36 may determine that a kickback condition has occurred based on a determination that that value of the rotational sensor signal or a rate of change of the rotational sensor signal has exceeded a threshold value. When this occurs, the microcontroller 36 will initiate one or more protective operations intended to avoid and/or minimize any undesired rotation of the power tool, e.g., by shutting off or reducing power to the motor, by causing pulsing of the motor, and/or by actuating a mechanical clutch. It is readily understood that other techniques for assessing the signal received from the rotational sensor are within the scope of the present invention.

The microcontroller 36 may also disable or delay initiation of the protective operation upon making a determination that the signal from the rotational sensor is likely to be providing a false indication of a kickback condition. For example, the microcontroller may receive a current signal from the current sensor 28 that indicates the amount of current being drawn by the motor. If the current is below a threshold value, the microcontroller 36 may determine that the power tool 10 is being operated under a no load condition or in hammer only mode, and therefore, may disregard any indication of a kickback condition received from the rotation sensor 32. In addition, the microcontroller 36 may receive a mode signal from the mode sensor 39 that indicates which mode of operation has been selected by the user. If the mode sensor 39 indicates that the user has selected a hammer only mode, the microcontroller may disregard any indication of kickback received from the rotation sensor 32, or may alter the rotational signal threshold for determining that a kickback condition has occurred. If the microcontroller determines that the signal from the rotational sensor is likely to be a false, the microcontroller may fail to initiate the protective operation or may delay initiation of the protective operation for a predetermined period of time to determine whether the user has regained control of the tool.

Figure 2:
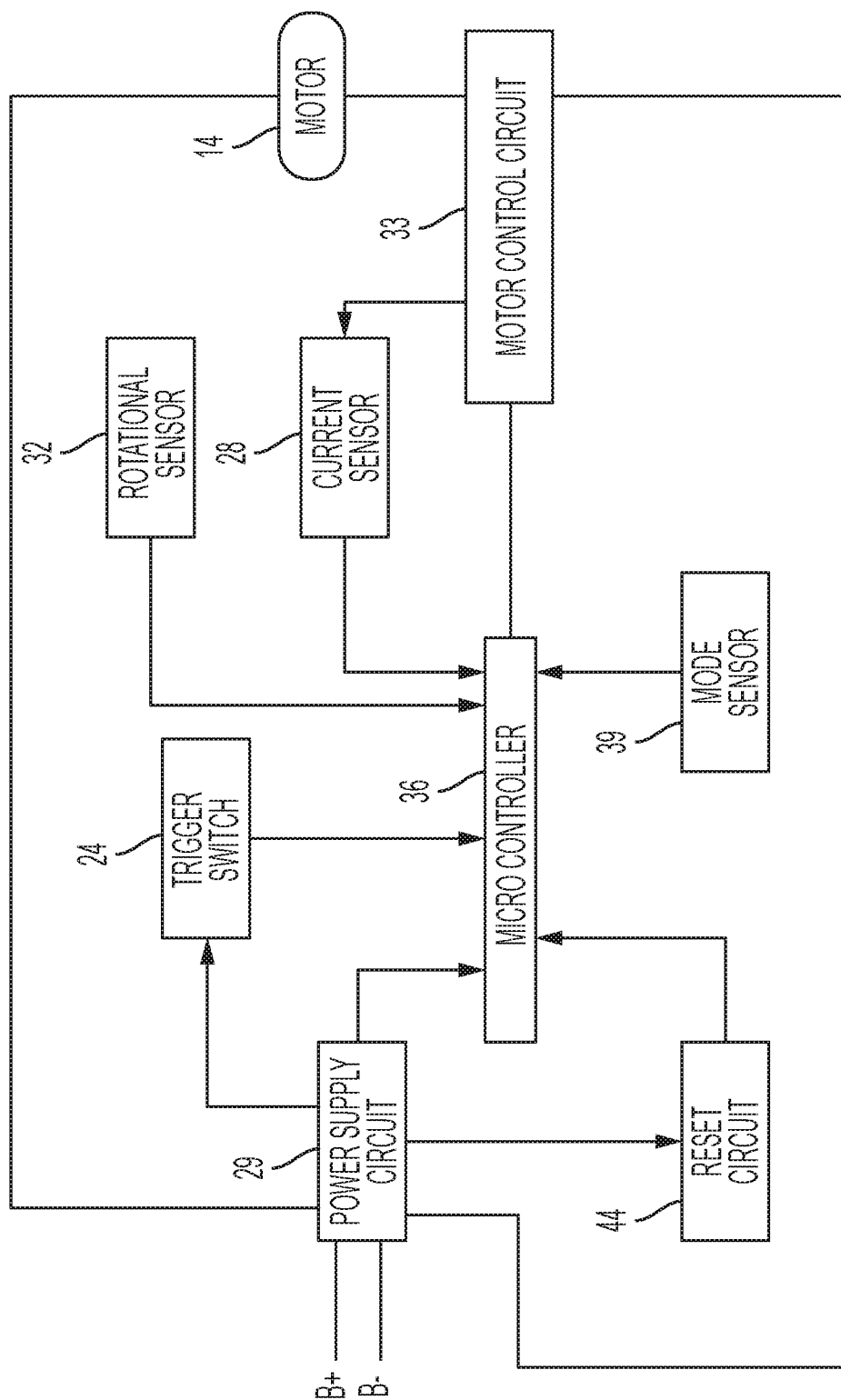
FIG. 2 is simplified block diagram of an exemplary control system of the power tool of FIG. 1.

Operation of an exemplary control circuit 30 is further described below in relation to FIG. 2. A power supply circuit 29 is coupled to the B+ and B− power line inputs from the power supply 26 and supplies a controlled DC voltage to operate the microcontroller 36 and the motor 14. The trigger switch 24 supplies a trigger signal to the microcontroller 36. This trigger signal indicates the position or setting of the trigger switch 24 as it is manually operated by the power tool operator. Drive current for operating the motor 14 is controlled by a motor control circuit 33. The motor control circuit 33 is, in turn, controlled by a signal supplied by microcontroller 36. If desired, the control system 30 may include a reset circuit 44 which, when activated, causes the microcontroller 36 to be re-initialized.

The current sensor 28 is connected with the motor control circuit 33 and the motor 14. In an exemplary embodiment, the current sensor 28 may be a low resistance, high wattage resistor. The voltage drop across the current sensor 28 is measured as an indication of actual instantaneous motor current. The instantaneous motor current may supplied to an average current measuring circuit (not shown) which in turn may supply an average current value to the microcontroller 36. The microcontroller 36 may use the current signal to evaluate whether the rotation sensor is likely to give a false indication of a kickback condition and/or to confirm the indication of a kickback condition from the rotation sensor.

In operation, the trigger switch 24 supplies a trigger signal that varies in proportion to the switch setting to the microcontroller 36. Based on this trigger signal, the microcontroller 36 generates a control signal to the motor control circuit 33, which causes the motor to draw current and operate at a desired motor speed and direction (e.g., by PWM control). During operation, the current sensor 28 monitors the motor current and provides a current signal indicative of the motor current to the microcontroller 36. In addition, the rotational sensor 32 senses rotational displacement, velocity or acceleration of the housing and provides a rotational signal indicative of these sensed values to the microcontroller. Finally, the mode sensor 39 senses a position of the mode change knob 37 and provides a mode signal indicative of the selected mode to the microcontroller. Based on the current signal, the rotational signal and the mode signal, the microcontroller 36 determines whether a kickback determination is has occurred and whether such kickback condition is likely to be false. If the microcontroller determines that the kickback condition is not likely to be false and that a kickback condition has occurred, the microcontroller initiates one or more protective operations.

The protective operation may include one or more of (and are not limited to) disconnecting power to the motor 14, reducing power to the motor 14, braking the motor 14, disengaging the motor 14 from the spindle 12 and actuating a clutch disposed between the motor 14 and the spindle 12, or pulsing the motor 14 (e.g., in a manner described in U.S. Pat. No. 6,479,958, which is incorporated by reference). Depending on the size and orientation of the tool 10, one or more of these protective operations may be initiated to prevent undesirable rotation of the tool 10.

Figure 3A:
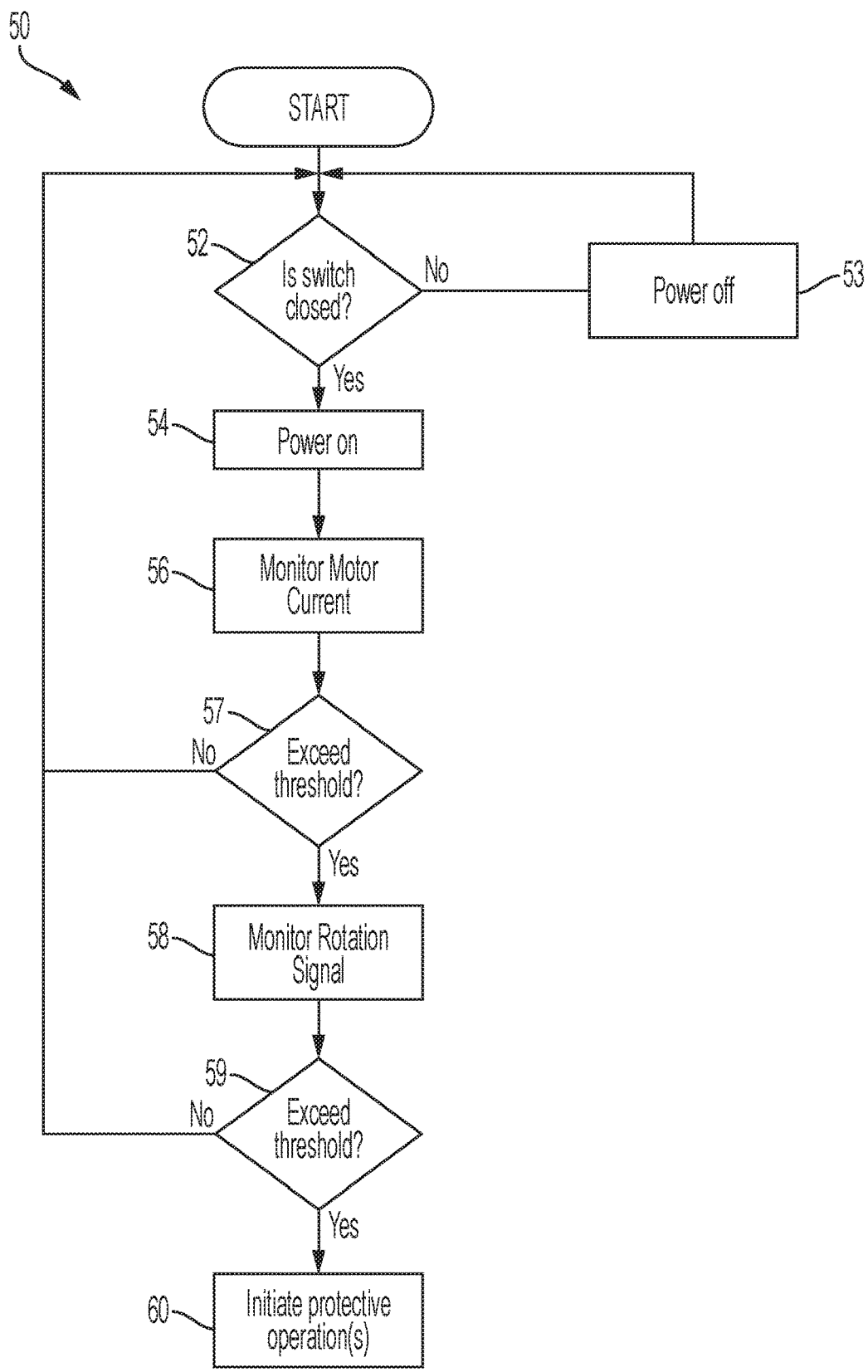
FIG. 3A is a flowchart showing a first exemplary control system and method for the power tool of FIG. 1.

Referring to FIG. 3A, an exemplary method 50 for determining the onset of valid kickback condition is illustrated. First, at step 52, the microcontroller determines whether the trigger switch is closed to determine if the tool is operating. If the switch is not closed, then power is not being supplied to the motor as indicated at step 53. In this case, there is no need to monitor for kickback conditions. Conversely, if the switch is closed, then power is being supplied to the motor as indicated at step 54.

If the power is on, then at step 56, the microcontroller monitors the current signal that indicates the amount of motor current. At step 57, the amount of motor current is compared to a threshold amount stored in memory. If the amount of motor current is at or below the threshold (e.g., below 8 amps), then the microcontroller determines that the motor is not operating under a loaded condition (e.g., the tool is not being used to drill into material or is being operated in hammer only mode), and any kickback indication of the rotational sensor is likely to be false. Therefore, the microcontroller will return to the start of the algorithm. On the other hand, if the motor current exceeds the current threshold, then the microcontroller determines that a kickback indication from the rotational sensor is likely to be valid. In other embodiments, at step 57, the microcontroller may compare a mathematical function of the current signal (e.g., a first or second derivative of the current signal such as a rate of change of current) to a threshold value to make this determination. In yet other embodiments, the current threshold values may vary depending on other tool conditions (e.g., a motor speed or the mode of the transmission).

Next, at step 58, the microcontroller monitors the rotation signal from the rotational motion sensor 32, which may indicate the rotational displacement, rate, or acceleration of the tool housing. At step 59, the microcontroller compares the value of the rotational signal (or of a mathematical function of the rotational signal) to one or more predetermined thresholds. If the value is less than or equal to the threshold, the microcontroller determines that no kickback condition has occurred and returns to the beginning of this process. On the other hand, if the value exceeds the threshold, then the microcontroller determines that a kickback condition has occurred, and, at step 60, initiates one or more protective operations. It is envisioned that one or more of rotational rate of the tool, rotational displacement, rotational acceleration, or some combination or mathematical function thereof as derived from the sensor signal may be used to determine the onset of a kickback condition.

Figure 3B:
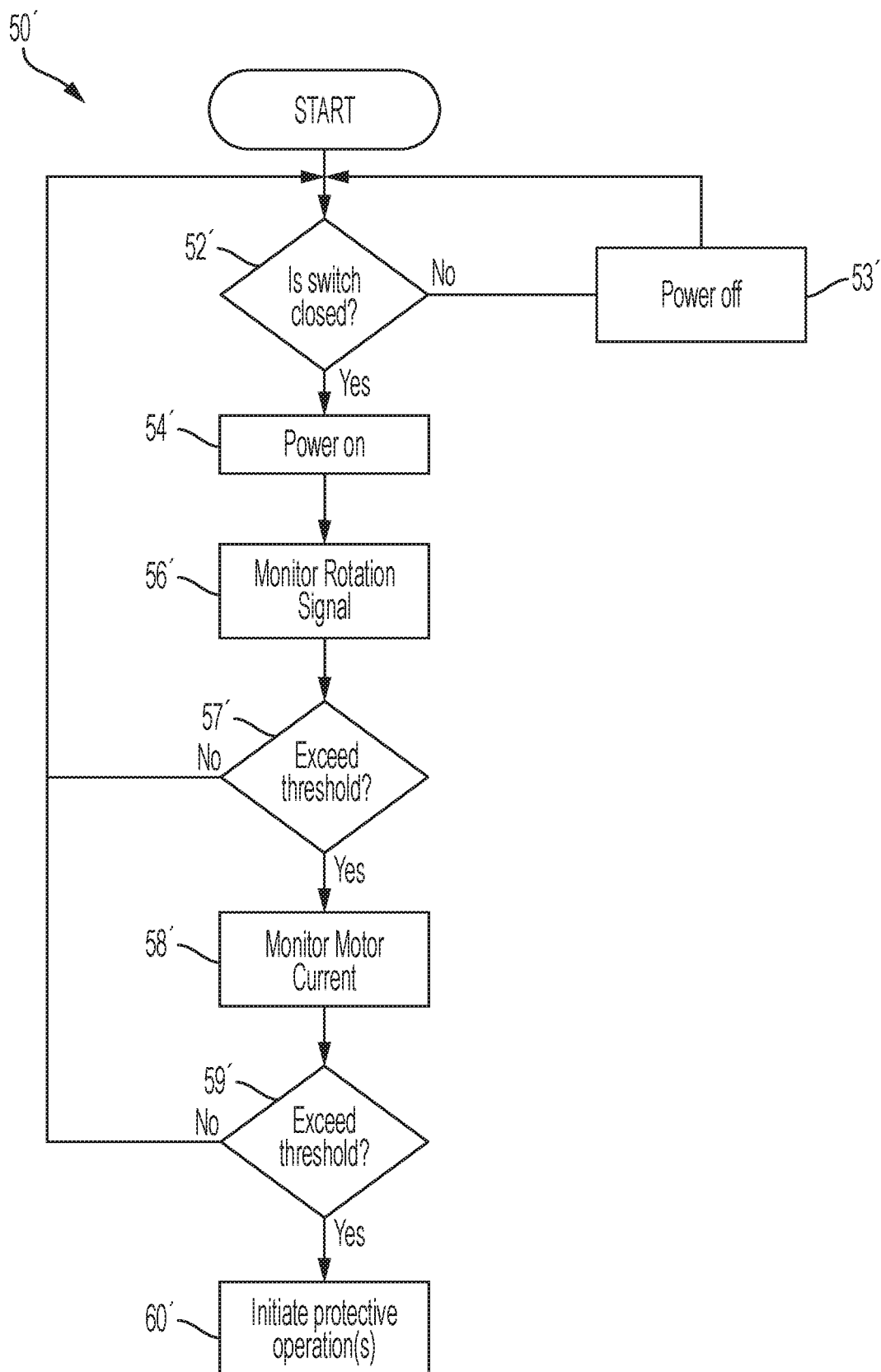
FIG. 3B is a flowchart showing a second exemplary control system and method for the power tool of FIG. 1.

It should be understood that the order of operations of the algorithm may be changed. For example, referring to FIG. 3B, in another exemplary method 50' for determining the onset of a non-false kickback condition, the microcontroller may first monitor and determine whether the rotational signal exceeds a threshold value (indicating a kickback condition), and, only if a kickback condition is indicated, next monitor and determine whether the current signal indicates a false kickback determination. Steps 52'-54' are substantially the same as steps 52-54 in the method 50 illustrated in FIG. 3A. If, at step 54', the power is on, then at step 56', the microcontroller monitors the rotation signal from the rotational motion sensor 32, which may indicate the rotational displacement, rate, or acceleration of the tool housing. At step 57', the microcontroller compares the value of the rotational signal (or of a mathematical function of the rotational signal) to one or more predetermined thresholds. If the value is less than or equal to the threshold, the microcontroller determines that no kickback condition has occurred and returns to the beginning of this process. On the other hand, if the value exceeds the threshold, then the microcontroller determines that a kickback condition has occurred. It is envisioned that one or more of rotational rate of the tool, rotational displacement, rotational acceleration, or some combination or mathematical function thereof as derived from the sensor signal may be used to determine the onset of a kickback condition.

Next, the microcontroller determines whether the detected kickback condition is likely to be false. At step 58', the microcontroller monitors the current signal that indicates the amount of motor current. At step 59', the amount of motor current is compared to a threshold amount stored in memory. If the amount of motor current is at or below the threshold (e.g., below 8 amps), then the microcontroller determines that the motor is not operating under a loaded condition (e.g., the tool is not being used to drill into material or is being operated in hammer only mode), and any kickback indication of the rotational sensor is likely to be false. Therefore, the microcontroller will return to the start of the algorithm. On the other hand, if the motor current exceeds the current threshold, then the microcontroller determines that a kickback indication from the rotational sensor is likely to be valid and, at step 60, initiates one or more protective operations. In other embodiments, at step 57', the microcontroller may compare a mathematical function of the current signal (e.g., a first or second derivative of the current signal such as a rate of change of current) to a threshold value to make this determination. In yet other embodiments, the current threshold values may vary depending on other tool conditions (e.g., a motor speed or the mode of the transmission).

Figure 4:
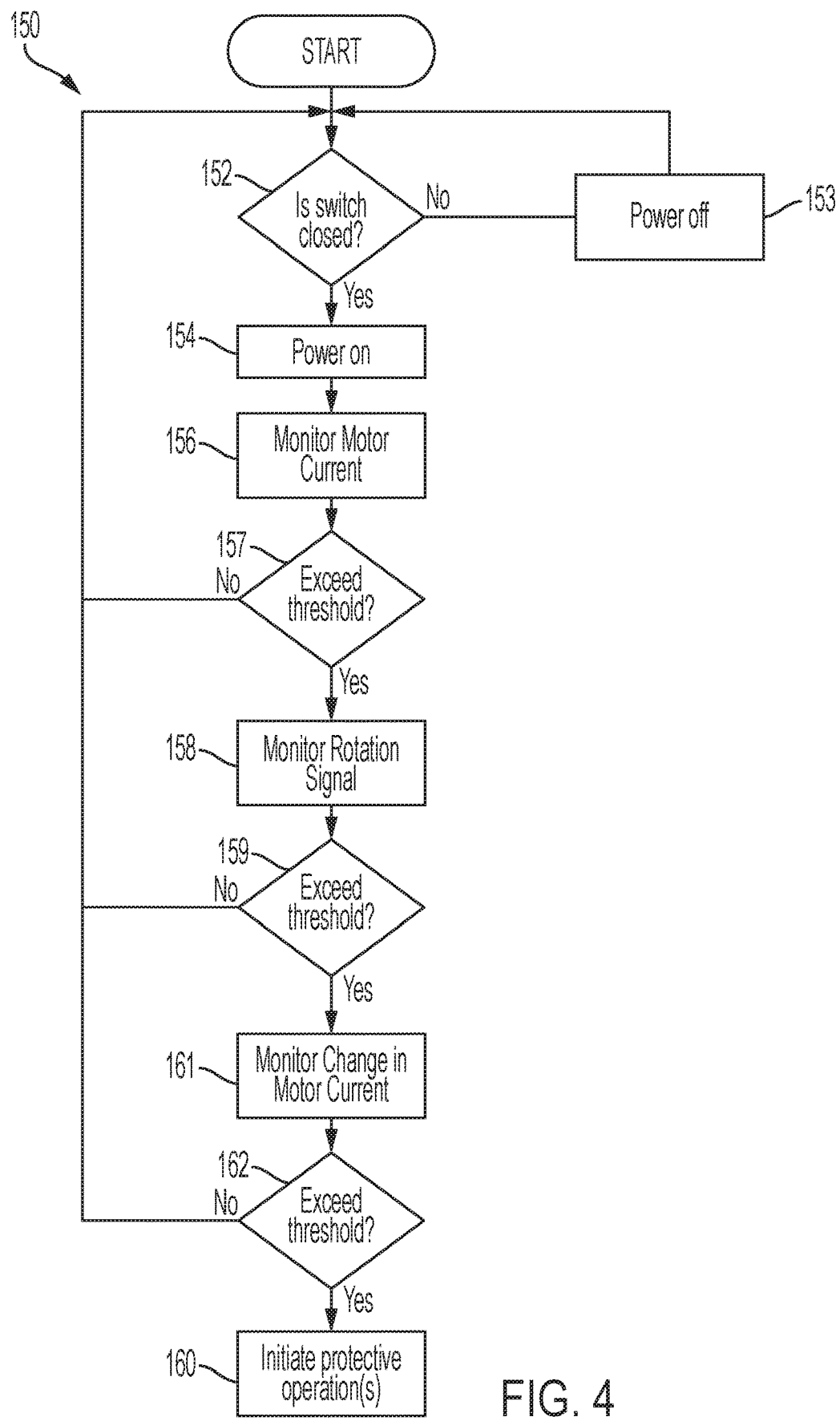
FIG. 4 is a flowchart showing a third exemplary control system method for the power tool of FIG. 1.

Referring to FIG. 4, another exemplary method 150 for determining the onset of a non-false kickback condition is illustrated. Steps 152-159 are substantially the same as steps 52-59 in the method 50 illustrated in FIG. 3A. If, at step 159, the microcontroller determines that the value of the rotational signal (or of a mathematical function of the rotational signal) exceeds one or more predetermined thresholds, then at steps 161-162 the microcontroller again uses the motor current signal to confirm that the kickback condition is valid. At step 161, the microcontroller determines the rate of change of the motor current. At step 162, if the rate of change of motor current is positive and exceeds a predetermined threshold, then one or more protective operations are initiated at 160. If either the rate of change is not positive or the rate of change does not exceed the threshold, then processing control returns to the beginning of the algorithm. In this case, a sudden change in the current draw is optionally used to confirm the onset of the kickback condition. It is envisioned that inputs from other sensors, such as a temperature sensor, may be used in a similar manner.

Figure 5:
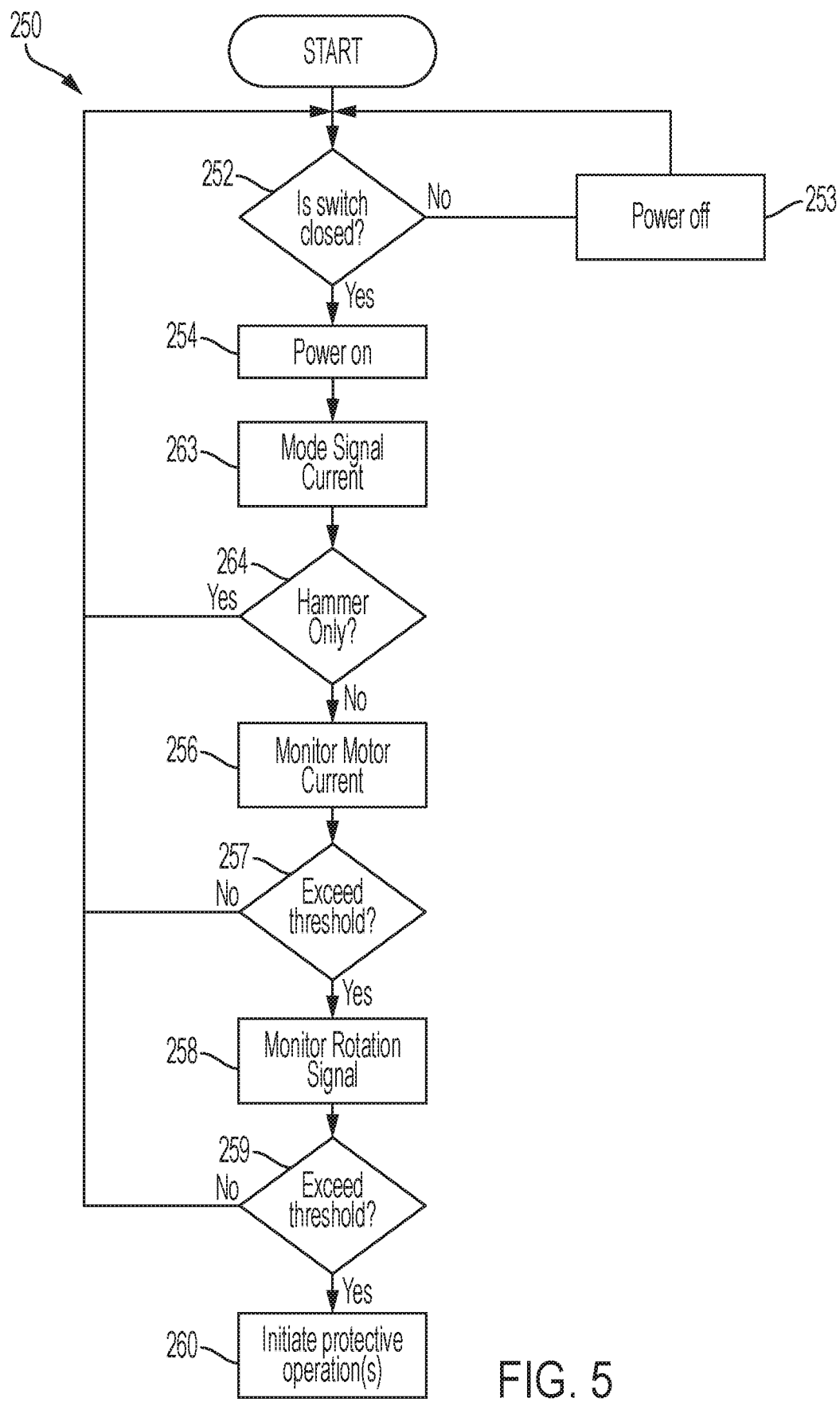
FIG. 5 is a flowchart showing a fourth exemplary control system method for the power tool of FIG. 1.

Referring to FIG. 5, another exemplary method 250 for determining the onset of a non-false kickback condition is illustrated. Steps 252-254 are substantially the same as steps 52-54 and 152-154 in the methods 50 and 150 illustrated in FIGS. 3A and 4. At step 263, after determining that the power is on, the microcontroller monitors the mode signal from the mode sensor to determine the mode of operation selected by the user. At step 264, the microcontroller determines whether the hammer only mode has been selected. If so, then the microcontroller disregards any signals from the motor current sensor and the rotational sensor that may indicate a kickback condition, and returns to the beginning of the algorithm. If not, then the microcontroller proceeds to steps 256-260, which are substantially the same as steps 56-60 and 156-160 in the methods 50, 150 illustrated in FIGS. 3A and 4. In doing so, the microcontroller determines whether a valid kickback condition has occurred, and, if so, initiates one or more protective operations. The method 250 may also optionally include confirmatory steps 161-162 of the method 150 of FIG. 4 between steps 259 and 260 to use the rate of change of motor current to confirm that a valid kickback condition has occurred before initiating the protective operation(s) at step 260.

Figure 6:
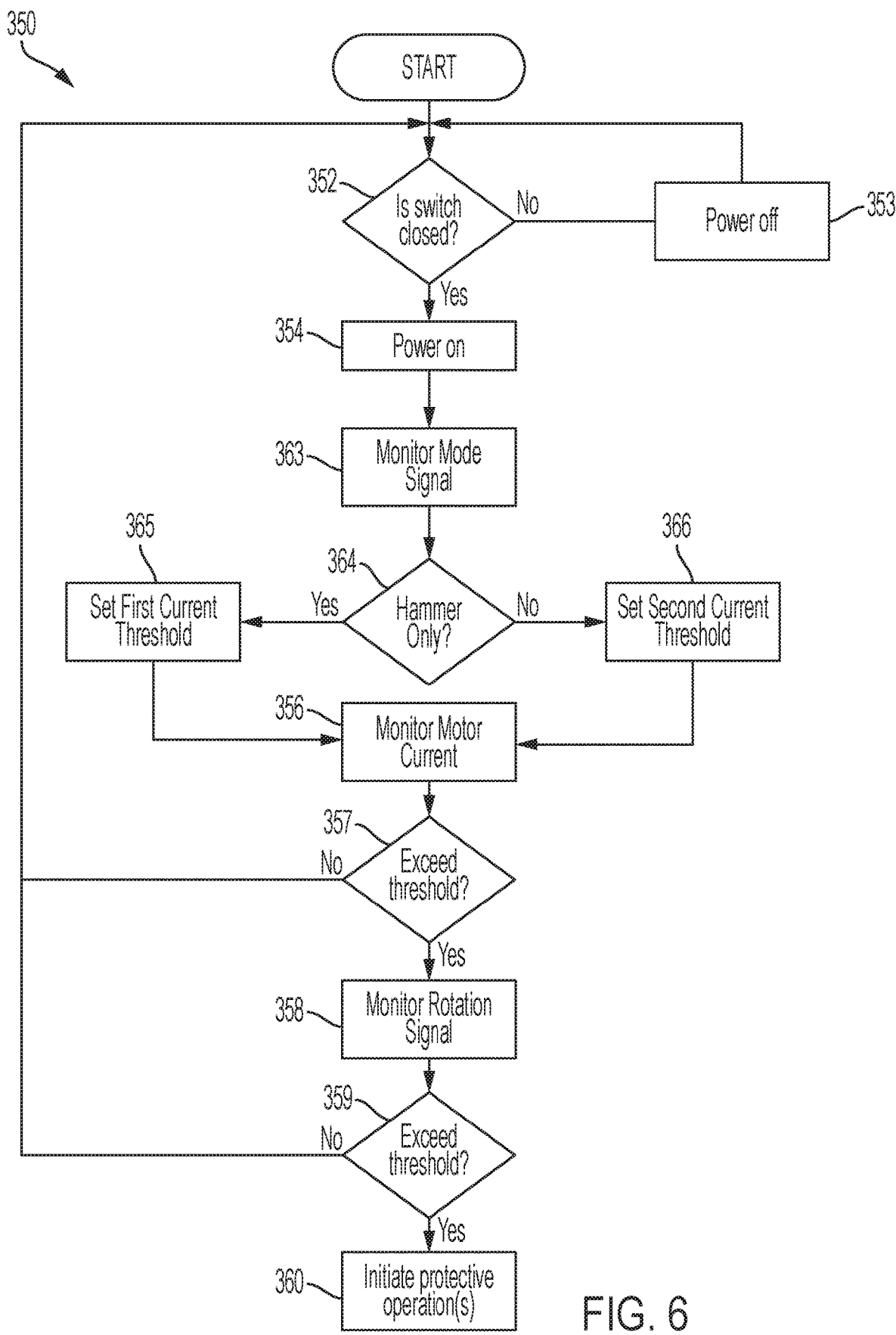
FIG. 6 is a flowchart showing a fifth exemplary control system method for the power tool of FIG. 1.

Referring to FIG. 6, another exemplary method 350 for determining the onset of a non-false kickback condition is illustrated. Steps 352-354 are substantially the same as steps 52-54, 152-154, and 162-164 in the methods 50, 150, and 250 illustrated in FIGS. 3A, 4, and 5. At step 363, after determining that the power is on, the microcontroller monitors the mode signal from the mode sensor to determine the mode of operation selected by the user. At step 364, the microcontroller determines whether the hammer only mode has been selected. If so, then at step 365, the microcontroller sets a first threshold value for current. If not, then at step 366, the microcontroller sets a second threshold value for current, which may be the same as or different from the first threshold value.

After either of steps 365 or 366, the process proceeds to step 356, and the microcontroller monitors the current signal that indicates the amount of motor current. At step 357, the amount of motor current is compared to either the first threshold current value set in step 365 or the second threshold value set in step 366. If the amount of motor current is at or below the threshold (e.g., below 10 amps for hammer only mode or below 8 amps for drill mode or hammer drill mode), then the microcontroller determines that the motor is not operating under a sufficiently loaded condition, and any kickback indication of the rotational sensor is likely to be false. Therefore, the microcontroller will return to the start of the algorithm. On the other hand, if the motor current exceeds the set current threshold, then the microcontroller determines that a kickback indication from the rotational sensor is likely to be valid.

The microcontroller then proceeds to steps 258-260, which are substantially the same as steps 58-60, 158-160, and 258-260 in the methods 50, 150, 250 illustrated in FIGS. 3A, 4, and 5. In doing so, the microcontroller determines whether a valid kickback condition has occurred, and, if so, initiates one or more protective operations. The method 350 may also optionally include confirmatory steps 161-162 of the method 150 of FIG. 4 between steps 359 and 360 to use the rate of change of motor current to confirm that a valid kickback condition has occurred before initiating the protective operation(s) at step 360.

In another aspect, each of the above control schemes may initiate different protective operations for different tool conditions. For example, the amount of angular displacement experienced by the tool may dictate different protective operations. When angular displacement is within a first range (e.g., less than 31°), the operator may be presumed to have control of the tool and thus no protective operations are needed. When the angular displacement exceeds this first range, it may be presumed that the tool has encountered a kickback condition and therefore some protective operation may be needed. In this second range of angular displacement (e.g., between 30° to 90°), the control scheme may initiate a pulse mode in hope of breaking through the restrictions that are causing the impending kickback condition. In contrast, when the angular displacement exceeds the second range (e.g., greater than 90°), it may be presumed that the operator has lost control of the tool. In this instance, a different protective operation may be initiated by the control scheme, such as disconnecting the power to the motor.

Depending on the complexity of the control scheme, three or more ranges of displacement may be defined for a given power tool. Within a range, protective operations may be initiated based on the angular displacement or a combination of parameters, such as angular acceleration, angular velocity, motor current, rate of change of motor current, motor temperature, switch temperature, etc. It is readily understood that the number and size of the ranges may vary for different control schemes and/or different types of tools. It is also envisioned that different protective operations may be initiated based on ranges of other parameters (e.g., ranges of angular velocity). Likewise, one or more protective operations may be associated with different ranges (i.e., tool conditions). Such additional ranges and protective operations are described in more detail in U.S. Pat. No. 7,410,006, which is incorporated by reference.

Determination of a kickback condition may be based on other types of criteria. For example, a kickback condition may be assessed based on the rotational energy experienced by the power tool. In this example, rotational energy is defined as $E_{\omega\text{-}TOOL}=(I)(\omega_{TOOL})^2$, where I is the moment of inertia and $\omega_{TOOL}$ is the angular velocity. For this computation, the rate of angular displacement could be measured by a rotational motion sensor; whereas, the moment of inertia of the tool ($I_{TOOL}$) could be preprogrammed into the controller based on the mass properties of the power tool (e.g., mass, rotation inertia and a center of gravity position) and a distance measure between the center of gravity position and the spindle axis. Initiating a protective operation based on $E_{\omega\text{-}TOOL}$ is desirable because the energy condition is not tool specific and therefore could be applied to a variety of anti-kickback applications. Other criteria for determining a kickback condition are also within the broader aspects of the present invention.

Example embodiments have been provided so that this disclosure will be thorough, and to fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

What is claimed is:

1. A power tool comprising:
   a housing;
   a motor received in the housing;
   an output driven by the motor; and
   a control system that includes a rotational motion sensor configured to generate a rotational motion signal that corresponds to a rotational motion of the housing about an axis, a current sensor configured to generate a current signal that corresponds to an amount of current drawn by the motor, and a control circuit that is configured to receive the rotational motion signal and the current signal and to control operation of the motor,
   wherein the control circuit is configured to initiate one or more protective operations upon determining: (a) from the current signal, that at least one of the amount of current drawn by the motor and a derivative of the amount of current drawn by the motor exceeds a first threshold value; and (b) from the rotational motion signal, that at least one of an angular rotation, an angular velocity, and an angular acceleration of the housing about the axis exceeds a second threshold value.

2. The power tool of claim 1, wherein the one or more protective operations includes one or more of interrupting power to the motor, reducing power to the motor to a non-zero value, pulsing the motor, braking the motor, and actuating a clutch.

3. The power tool of claim 1, wherein the rotational motion sensor comprises one or more of a gyroscope and an accelerometer.

4. The power tool of claim 1, wherein the current sensor comprises a resistor.

5. The power tool of claim 1, wherein the control circuit comprises one or more of a controller, a microcontroller, and a motor control circuit.

6. The power tool of claim 1, further comprising a mode change mechanism configured to select among a plurality of modes of operation, and a mode change sensor configured to generate a mode change signal that corresponds to the selected mode.

7. The power tool of claim 6, wherein the control circuit is configured to prevent initiation of the one or more protective operations when the mode change signal indicates that a hammer mode has been selected.

8. The power tool of claim 6, wherein the control circuit is configured to set the first threshold value to a first current threshold value when the mode change signal indicates that a hammer mode has been selected and to a different second current threshold value when the mode change signal indicates that a hammer mode has not been selected.

9. The power tool of claim 1, wherein the controller is configured to determine that a false indication of a kickback condition has occurred upon determining: (a) from the motor current signal, that at least one of the amount of current drawn by the motor and a derivative of the amount of current drawn by the motor is less than or equal to the first threshold value; and (b) from the rotational motion signal, that at least one of the angular rotation, the angular velocity, and the angular acceleration of the housing about the axis exceeds the second threshold value.

10. The power tool of claim 1, wherein the derivative of the amount of current drawn by the motor is a rate of change of the amount of current drawn by the motor.

11. A method for initiating a protective response in a power tool having a housing, a motor received in the housing, an output driven by the motor, a current sensor, and a rotational motion sensor, the method comprising:
   receiving a current signal from the current sensor that corresponds to an amount of current drawn by the motor;
   receiving a rotational motion signal from the rotational motion sensor that corresponds to a rotational motion of the housing about an axis; and
   initiating one or more protective operations upon determining: (a) from the current signal, that at least one of the amount of current drawn by the motor and a derivative of the amount of current drawn by the motor exceeds a first threshold value; and (b) from the rotational motion signal, that at least one of an angular rotation, an angular velocity, and an angular acceleration of the housing about the axis exceeds a second threshold value.

12. The method of claim 11, wherein initiating the one or more protective operations comprises one or more of interrupting power to the motor, reducing power to the motor to a non-zero value, pulsing the motor, braking the motor, and actuating a clutch.

13. The method of claim 11, wherein the rotational motion sensor comprises one or more of a gyroscope and an accelerometer.

14. The method of claim 11, wherein the current sensor comprises a resistor.

15. The method of claim 11, further comprising receiving a mode signal that corresponds to a selected mode of operation of the power tool.

16. The method of claim 15, further comprising preventing initiating the one or more protective operations when the mode signal indicates that a hammer mode has been selected.

17. The method of claim 15, further comprising setting the first threshold value to a first current threshold value when the mode signal indicates that a hammer mode has been selected and to a different second current threshold value when the mode signal indicates that a hammer mode has not been selected.

18. The method of claim 15, further comprising determining that a false indication of a kickback condition has occurred upon determining: (a) from the motor current signal, that at least one of the amount of current drawn by the motor and a derivative of the amount of current drawn by the motor is less than or equal to the first threshold value; and (b) from the rotational motion signal, that at least one of the angular rotation, the angular velocity, and the angular acceleration of the housing about the axis exceeds the second threshold value.

19. The method of claim 11, wherein the derivative of the amount of current drawn by the motor is the rate of change of the amount of current drawn by the motor.

20. The method of claim 11, wherein determining that at least one of the amount of current drawn by the motor and the derivative of the amount of current drawn by the motor exceeds the first threshold value is performed only after determining that at least one of the angular rotation, the angular velocity, and the angular acceleration of the housing about the axis exceeds the second threshold value.

* * * * *